United States Patent

Dadea

[11] Patent Number: 5,762,799
[45] Date of Patent: Jun. 9, 1998

[54] FILTERING MEDIUM IN THE FORM OF A SHEET OF PAPER FOR FILTERS FOR FLUIDS IN GENERAL

[75] Inventor: Gianmaria Dadea, Fabriano, Italy

[73] Assignee: Fad-Fabriano Autoadesivi S.p.A., Sassoferrato, Italy

[21] Appl. No.: 891,788

[22] Filed: Jul. 14, 1997

[30] Foreign Application Priority Data

Jul. 18, 1996 [IT] Italy .................................. MI96A1496

[51] Int. Cl.$^6$ .................................................. B01D 39/18
[52] U.S. Cl. .................... 210/508; 210/496; 162/158; 162/164.1; 162/164.4; 162/166; 162/168.1
[58] Field of Search .................. 162/158, 164.1, 162/164.4, 166, 168.1; 210/496, 504, 506, 507, 508, 509

[56] References Cited

U.S. PATENT DOCUMENTS

| | | | |
|---|---|---|---|
| 4,097,649 | 6/1978 | Neumann | 428/327 |
| 4,232,087 | 11/1980 | Trask | 210/508 |
| 4,321,288 | 3/1982 | Ostreicher | 210/508 |
| 4,623,462 | 11/1986 | Urig | 210/508 |
| 4,925,560 | 5/1990 | Sorrick | 210/509 |
| 5,028,332 | 7/1991 | Ohnishi | 210/506 |
| 5,129,923 | 7/1992 | Hunter | 210/504 |

*Primary Examiner*—Ernest G. Therkorn
*Attorney, Agent, or Firm*—Guido Modiano; Albert Josif

[57] ABSTRACT

A filtering medium in the form of a sheet of paper for filters for fluids in general, wherein the paper impregnating agent is an aqueous emulsion of:

an anionic aqueous disperse system of a copolymer based on n-butylacrylate-styrene.
Dosage: 20%–50% by weight;

an aqueous disperse system of a copolymer which can be thermally cross-linked and is based on butyl acrylate and acrylonitrile.
Dosage: 30%–70% by weight;

an aqueous disperse system of melamine-formaldehyde resin, etherified with methanol.
Dosage: 1%–20% by weight;

an aqueous disperse system of fluorocarbon resin.
Dosage: 5%–40% by weight;

an aqueous emulsion of organopolysiloxane.
Dosage: 0%–15% by weight.

1 Claim, No Drawings

FILTERING MEDIUM IN THE FORM OF A SHEET OF PAPER FOR FILTERS FOR FLUIDS IN GENERAL

BACKGROUND OF THE INVENTION

The present invention relates to a filtering medium in the form of a sheet of paper for filters for fluids in general.

Fluid filtration is conventionally required in many fields of technology in order to give said fluids a safety degree which makes them suitable to be used.

This is the case, for example, of internal-combustion engines, in which filtration of the lubricating oil and of the comburent air is required, and it is the case, merely as a second example, of the air conditioning for rooms assigned to special functions, such as laboratories or operating rooms.

Conventional filters are produced according to various solutions, all of which however consist substantially of a structure for supporting a filtering medium through which the fluid to be filtered is passed so as to flow between a region connected to an inlet connector and a region connected to an outlet connector; the filtering medium used most commonly is constituted by a sheet of paper which is inserted in the filter after it has been folded or rolled up in a wide range of different manners.

The process currently used to manufacture a filter is considered first of all, starting from what occurs in the paper mill where the filtering medium is prepared.

After manufacturing the paper, it is necessary to impregnate it with substances capable of giving it the required functional characteristics, and one proceeds by means of epoxy resins in solvents which are toxic.

This fact entails considerable problems, starting from the storage of the solvents and the preparation of the solution; these operations must be carried out using all the precautions and techniques required by the handling of toxic substances.

After impregnation, it is necessary to dry the paper; for this purpose it is necessary to use a very long oven in order to provide a slow process, such as to avoid the formation of explosive mixes; moreover, it is necessary to provide said oven with devices for recovering the evaporated solvents, which as mentioned are toxic substances.

The impregnated paper is transferred from the paper mill to the filter manufacturer facilities where, after being cut and folded to form the filter, it is placed in an oven in order to polymerize the epoxy resins, losing elasticity which, once the treatments have been performed, is no longer necessary, and assuming the rigidity which is sufficient to withstand the thrust of the fluid that flows through the filter in addition to the necessary water20 repellency.

This oven also has a considerable size and must be equipped with devices for recovering the evaporated solvents.

However, environmental impact is not limited to this, since the waste produced by the treatments performed before insertion in the oven is also qualified as toxic and noxious waste.

SUMMARY OF THE INVENTION

In view of the above drawbacks, the aim of the present invention is to provide a filtering medium in the form of a sheet of paper which can be produced with a method that has absolutely no environmental impact and is also simplified from the technological point of view.

This aim is achieved by a filtering medium in the form of a sheet of paper for filters for fluids in general, characterized in that the paper impregnating agent is an aqueous emulsion of:

an anionic aqueous disperse system of a copolymer based on n-butylacrylate-styrene.
Dosage: 20%–50% by weight;
an aqueous disperse system of a copolymer which can be thermally cross-linked and is based on butyl acrylate and acrylonitrile.
Dosage: 30%–70% by weight;
an aqueous disperse system of melamine-formaldehyde resin, etherified with methanol.
Dosage: 1%–20% by weight;
an aqueous disperse system of fluorocarbon resin.
Dosage: 5%–40% by weight;
an aqueous emulsion of organopolysiloxane.
Dosage: 0%–15% by weight;

Adoption of this impregnating agent provides for considerable advantages.

As regards the paper mill, the elimination of toxic solvents fully eliminates the problems related to the storage and preparation of the solution; moreover, the drying oven, no longer required to cause the evaporation of solvents which may create explosive mixes, but required to cause the evaporation of water instead, can be smaller, so as to allow easy combination with the continuous machine that produces the paper.

Said oven furthermore no longer needs to be equipped with devices for recovering the evaporated substances.

Considerable advantages from the environmental and technological point of view are thus achieved by the impregnating agent according to the present invention and not only in the process that occurs in the paper mill but also as regards the construction of the filter.

It should in fact be noted that the filtering medium that leaves the paper mill already has, in an optimum compromise, the required elasticity for being processed, rigidity for withstanding the thrust of the fluid meant to flow through it, and water repellency; moreover, said medium may be simply inserted, in particular cases, in a small oven suitable to enhance the rigidity characteristic where required.

The advantages of the present invention from the technological point of view are thus evident; an optimum situation is also obtained from the environmental point of view, since toxic vapors to be captured and toxic-noxious waste to be collected have been eliminated completely.

The described invention is susceptible of numerous modifications and variations, all of which are within the scope of the inventive concept.

What is claimed is:

1. A filtering medium in the form of a sheet of paper for filters for fluids in general, wherein the paper impregnating agent is an aqueous emulsion of:

an anionic aqueous disperse system of a copolymer based on n-butylacrylate-styrene;
Dosage: 20%–50% by weight;
an aqueous disperse system of a copolymer which can be thermally cross-linked and is based on butyl acrylate and acrylonitrile;
Dosage: 30%–70% by weight;
an aqueous disperse system of melamine-formaldehyde resin, etherified with methanol;
Dosage: 1%–20% by weight;
an aqueous disperse system of fluorocarbon resin;
Dosage: 5%–40% by weight;
an aqueous emulsion of organopolysiloxane;
Dosage: 0%–15% by weight.

* * * * *